United States Patent [19]

Stuart et al.

[11] Patent Number: 5,040,915
[45] Date of Patent: Aug. 20, 1991

[54] BREAKAWAY MOUNT

[75] Inventors: Kyle H. Stuart; Dale R. Bervig, both of Wichita, Kans.

[73] Assignee: Tweco Products, Inc., Wichita, Kans.

[21] Appl. No.: 332,570

[22] Filed: Mar. 31, 1989

[51] Int. Cl.$^5$ .......................... F16B 21/00; B66C 1/10
[52] U.S. Cl. ................................... 403/322; 403/146; 403/325; 414/730
[58] Field of Search ............... 403/146, 123, 321, 322, 403/325, 328, 2, 97, 112, 113; 414/729, 730, 735; 279/43, 47, 53; 248/542, 544, 550

[56] References Cited

U.S. PATENT DOCUMENTS

| | | | |
|---|---|---|---|
| 3,008,723 | 11/1961 | Caldwell | 279/53 |
| 3,266,059 | 8/1966 | Stelle | 403/123 X |
| 4,057,704 | 11/1977 | Gues et al. | 219/75 |
| 4,076,131 | 2/1978 | Dahlstrom et al. | 414/730 |
| 4,453,449 | 6/1984 | Hollmann | 403/328 X |
| 4,500,065 | 2/1985 | Hennekes | 248/544 X |
| 4,514,616 | 4/1985 | Warner | 219/136 |
| 4,540,869 | 9/1985 | Yasuoka | 219/124.34 |
| 4,636,135 | 1/1987 | Bancon | 414/730 |
| 4,639,184 | 1/1987 | Knasel et al. | 414/730 |
| 4,648,784 | 3/1987 | Wiedemann et al. | 414/730 |
| 4,650,388 | 3/1987 | Frioux et al. | 414/729 X |
| 4,652,203 | 3/1987 | Nakashima et al. | 414/730 |
| 4,655,674 | 4/1987 | Kohler et al. | 414/735 |
| 4,664,588 | 5/1987 | Newell et al. | 414/730 |
| 4,673,329 | 6/1987 | Kato | 414/744 |
| 4,681,202 | 7/1987 | Dinse | 192/129 |
| 4,700,932 | 10/1987 | Katsuno | 267/136 |
| 4,725,190 | 2/1988 | Kato | 414/730 |
| 4,741,642 | 5/1988 | Carlton | 403/59 |
| 4,786,769 | 11/1988 | Knasel et al. | 200/61.41 |
| 4,815,780 | 3/1989 | Obrist | 403/322 X |
| 4,830,565 | 5/1989 | Bucher et al. | 414/735 X |

OTHER PUBLICATIONS

Photographs Nos. 1-5: photographer: unknown, subject: Break-Away Mount manufactured by Binzel of the Federal Republic of Germany, date: 3/28/89.

Primary Examiner—Andrew V. Kundrat
Assistant Examiner—Franco S. DeLiguori
Attorney, Agent, or Firm—Herzog, Crebs & McGhee

[57] ABSTRACT

A breakaway mount connects a tool such as a welding torch with a robot or other automated machine. The mount can fully separate and detach from a baseplate in the event of a collision between the tool and the workpiece. The pneumatically operated mount is reassembled with the baseplate in a two-step procedure which allows the operator to move his fingers and hands away from the apparatus to avoid injury when the components are fully assembled. The breakaway mount can include a wrist joint which swivels back and forth in response to a collision between the tool and the workpiece. The apparatus can also be affixed with sensors to detect partial or complete detachment between the mount and the baseplate. The sensors shut down the robot or other automatic machinery in the event of partial or complete detachment. A second series of sensors can also be added to detect the movement in the wrist joint to likewise shut down the machinery. In an alternative embodiment, the mount is manually operated with a threaded screw to attach the mount to the baseplate. The present invention protects the tool, the robot or automatic machinery, and the workpiece from damage due to high speed collisions. The unique configuration of this mount also protects the operator when it is necessary to reconnect the mount to the baseplate after a substantial collision.

11 Claims, 6 Drawing Sheets

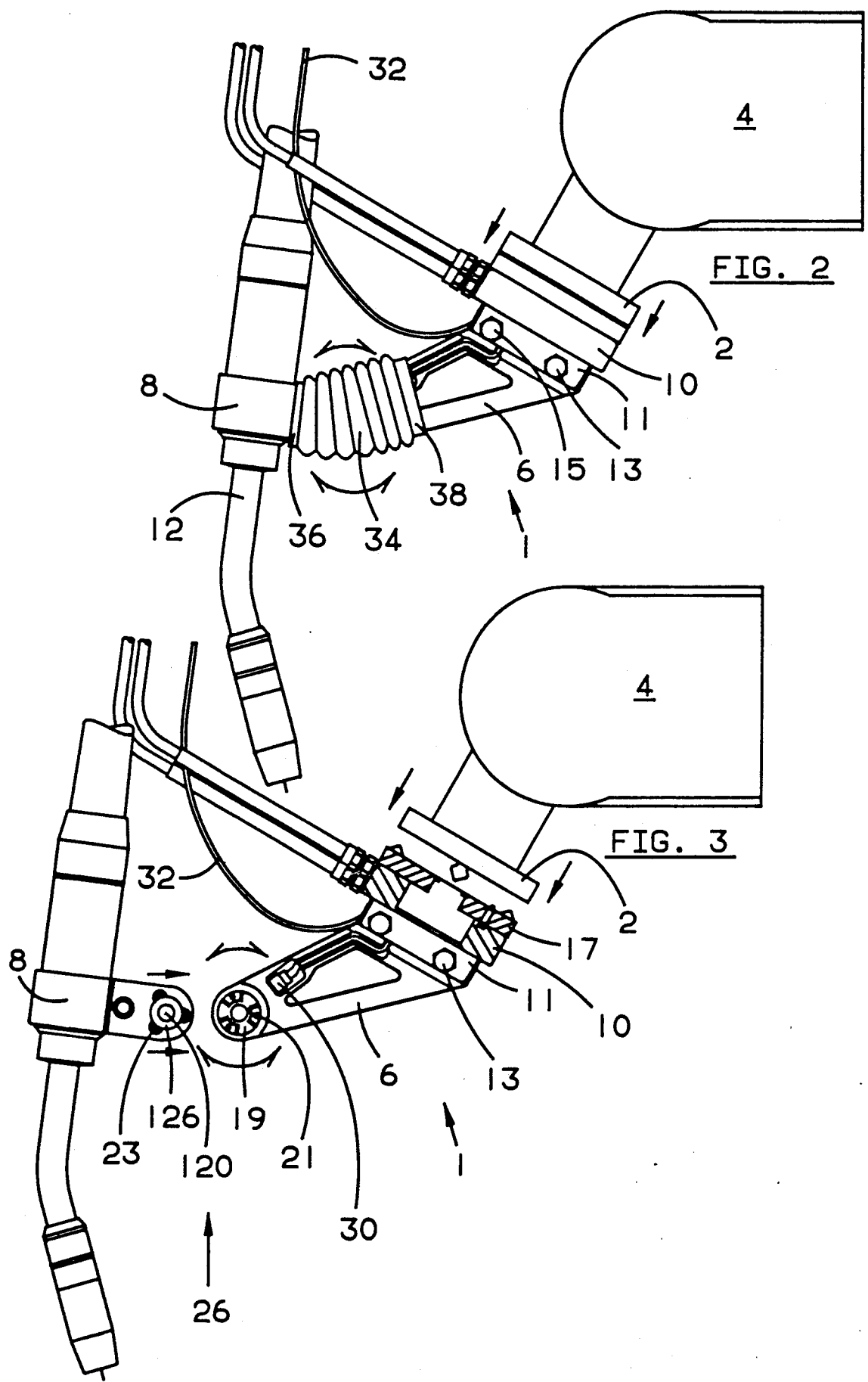

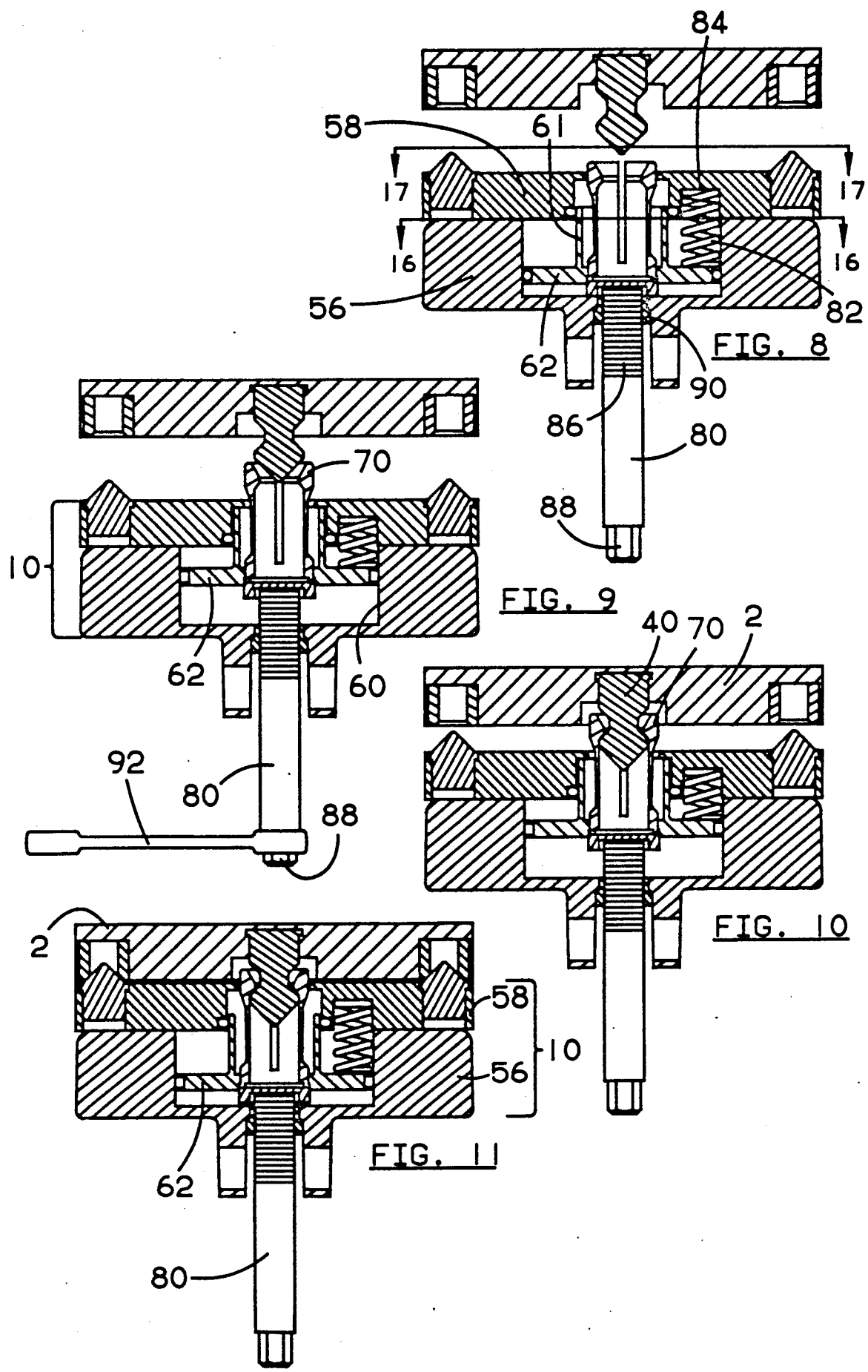

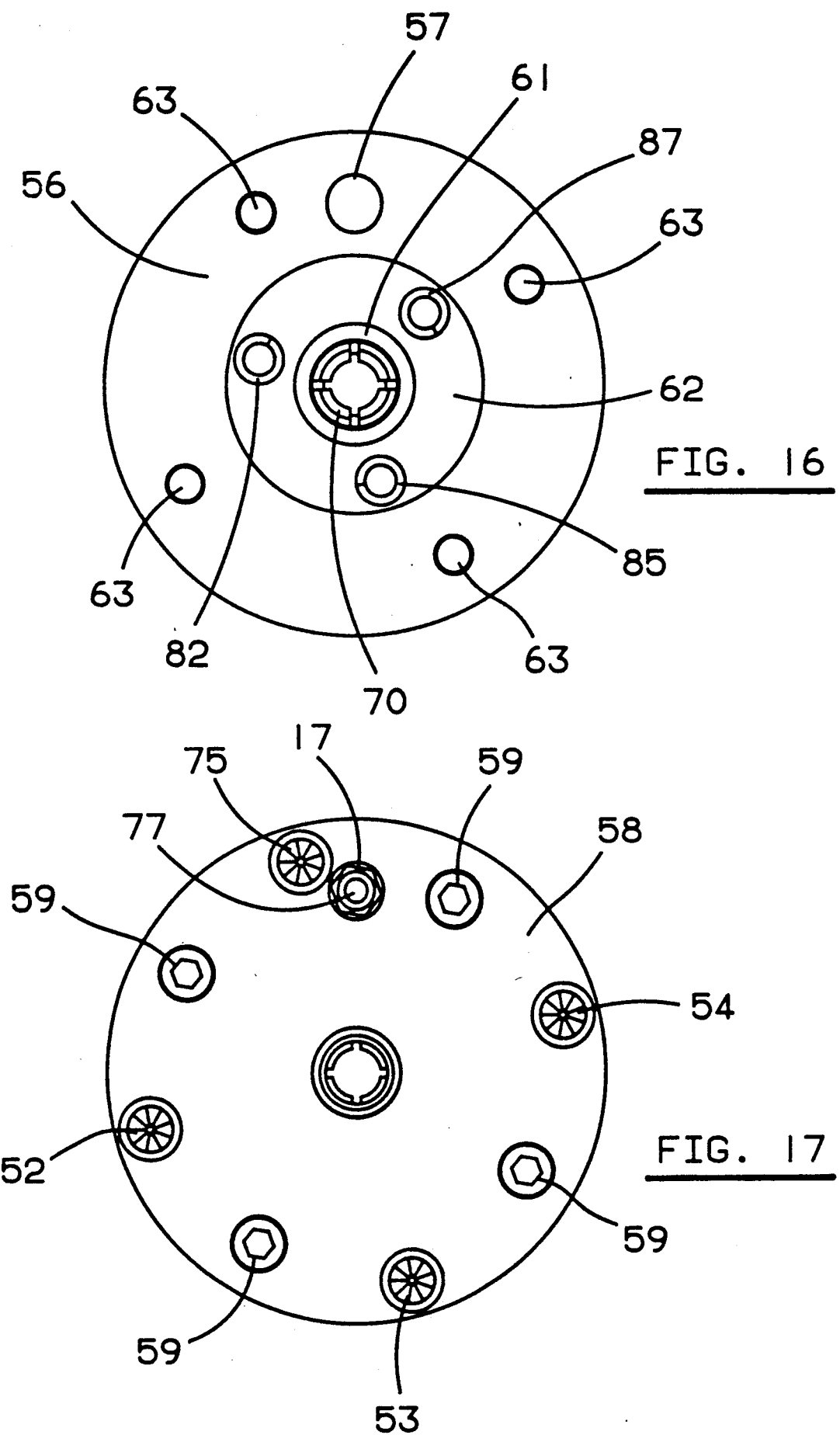

BREAKAWAY MOUNT

BACKGROUND OF THE INVENTION

1. Field of the Invention

The breakaway mount is an intermediary coupling means for attaching a tool, such as a welding torch, to a robot or other form of automated machine equipment. The breakaway mount serves as a safety device for protection of the tool, the automated machine and the workpiece in the event of an unexpected collision of the tool with the workpiece. In the preferred embodiment, the breakaway mount connects to a welding torch on one end and releasably connects to an automated welding machine on the other end. In the event of an unexpected collision between the welding torch and the workpiece, the breakaway mount is designed to breakaway from the automated machine to prevent damage to the torch, the automated machine and/or the workpiece. Sensors can be incorporated in the breakaway mount to shut down the automated machine in the event of a collision.

2. Description of the Prior Art

The general concept of an intermediary safety device between a tool and an automated machine is well known in the prior art. Safety devices take various forms such as the ball and socket joint disclosed in U.S. Pat. No. 4,673,329 and other types of joints which are able to articulate in the event of a collision, such as U.S. Pat. No. 4,514,616. These types of devices swivel or tilt in response to a collision, but are not free to breakaway from the automated machine. Other devices such as U.S. Pat. Nos. 4,639,184, 4,655,674, and 4,741,642 rely upon a spring mechanism to absorb the shock of a collision; however, none of these devices have the ability to breakaway from the automated machine.

Most prior art safety devices rely upon switches or other sensing means to stop the robot or automated machinery in the event of a collision; however, due to the increased operating speeds of automated machinery and the increased momentum of the tools, some collisions are so catastrophic that the switches and other disconnect means cannot react fast enough to prevent damage. In some situations, a breakaway mount is essential for protection of the tool, the automatic machine, and the workpiece.

U.S. Pat. No. 4,725,190 discloses a mount which is capable of breaking away from an automated machine and represents an advancement in the art of intermediary safety coupling devices. In this patent, the base plate forms a receptacle which is contoured to receive a conical pin which protrudes from the breakaway mount. The pin is engaged by a releasable gripping mechanism which is spring-loaded. This type of breakaway mount will protect the tools, the automated machinery and the workpiece even in the event of a catastrophic collision.

If such a collision occurs, the breakaway mount must be manually re-engaged with the base plate. Because of the powerful spring-loaded nature of the gripping mechanism, closure of the mount with the baseplate occurs in a quick snap action. If the operator is not being particularly attentive when he re-engages the mount with the baseplate, the snap action closure can pinch any portion of the hand which is caught between the mount and the baseplate. The breakaway mount disclosed in U.S. Pat. No. 4,725,190 provides significant protection to the automated machinery and the workpiece; however, the nature of the closure mechanism does not provide similar protection to the operator when the mount is manually re-engaged with the baseplate.

Binzel of West Germany also manufactures a breakaway mount with a snap action closure. Photographs of the Binzel apparatus are included in the Information Disclosure Statement. Binzel likewise operates with a powerful spring-loaded gripping mechanism which is roughly equivalent to that disclosed in U.S. Pat. No. 4,725,190. Binzel therefore has all of the disadvantages of the aforementioned patent.

The present invention discloses a breakaway mount for robotic or automatic machines which is safer than prior art devices from the standpoint of the operator who manually re-engages the mount with the baseplate. In the preferred embodiment, the present invention uses a two-step pneumatic closure mechanism which provides a greater degree of safety to the operator during the re-engagement process. This two-step mode of attachment of the mount to the baseplate gives the operator the opportunity to move his hand away from the apparatus before the two parts are forcefully driven together by a double-acting piston cylinder arrangement.

In an alternative embodiment, the present invention uses a manually operated screw to gradually attach the mount to the baseplate. This embodiment likewise provides more safety to the operator than prior art designs. This mode of attachment is rather gradual and therefore, the operator likewise has the opportunity to remove his hand to avoid injury.

In either of the aforementioned embodiments, the breakaway mount can also include sensing means to stop operation of the machinery when complete or partial detachment of the mount occurs. As previously noted, these sensory means sometimes do not react quick enough and therefore the breakaway feature provides further safety to the machinery.

SUMMARY OF THE INVENTION

A breakaway mount is disclosed. The mount is an intermediary safety coupling device for connection of a tool, such as a welding torch, with an automated machine or robot. In the event of a severe collision, the breakaway mount is forcibly detached from the baseplate of the automated machine. In order to re-engage the breakaway mount after a severe collision, an operator must manually re-attach the mount to the baseplate. In order to prevent injury to the operator's hand during re-attachment the preferred embodiment utilizes a two-step mode of closure which is preferred to the single step, snap-action type of closure as used in the prior art.

The preferred embodiment utilizes a sleeve which is carried by a piston in double-acting pneumatic cylinder. The sleeve and piston have an extended and a retracted position. In order to reattach the mount to the baseplate, the sleeve must be pneumatically driven to the extended position. The first step in reattachment is to manually position the mount underneath the baseplate. The sleeve is then engaged with the pin which protrudes from the baseplate. At this stage of engagement, there is approximately a ¼-inch gap between the surface of the mount and the surface of the baseplate so that the hand of the operator will not be pinched during the first step of engagement. The sleeve has sufficient gripping forces to support the mount and tool after the sleeve has been manually engaged with the pin. In the second step of attachment, the operator removes his hands from the mount and the baseplate and activates a valve which pneumatically drives the piston to its retracted position, thereby firmly engaging the mount with the baseplate. This two-step mode of attachment allows the operator an opportunity to remove his hands prior to firm attachment of the mount with the baseplate.

In an alternative embodiment, a manually operated screw drives the piston to its extended position. This manually operated screw is a much slower means of attaching the mount to the baseplate; however, it likewise provides a greater margin of safety for the operator because it gives him an opportunity to remove his hands from the gap between the mount and baseplate prior to firm closure.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 2 is a perspective view of the pneumatically operated breakaway mount of FIG. 1 from a different angle. A protective bellows is shown in FIG. 2 which is not shown in FIG. 1.

FIG. 3 is an exploded view of the pneumatically operated breakaway mount shown in FIGS. 1 and 2. The housing assembly is shown in section view. The wrist joint has been disassembled to show the face of the one disk. The bellows is not shown in this figure.

FIG. 8 is a section view of the alternative embodiment which is manually operated by a screw. The baseplate and mount are fully detached. The sleeve and piston are shown in a fully retracted position.

FIG. 9 is a section view of the baseplate and housing assembly, of the alternative embodiment, showing the sleeve and piston in fully extended position just prior to engagement of the sleeve with the pin.

FIG. 10 is a section view of the baseplate and housing assembly, of the alternative embodiment, showing the sleeve and piston in fully extended position. This figure shows the first step of attachment whereby the sleeve has been manually attached to the pin.

FIG. 11 shows the second step of attachment whereby the baseplate is firmly attached to the mount. The baseplate and housing assembly are shown in section view. The sleeve and piston are shown in their retracted position.

FIG. 16 is a top view of the housing assembly taken along line 16—16 of FIG. 8.

FIG. 17 is a top view of the mount taken along line 17—17 of FIG. 8.

DESCRIPTION OF THE PREFERRED EMBODIMENT

Figure 1:
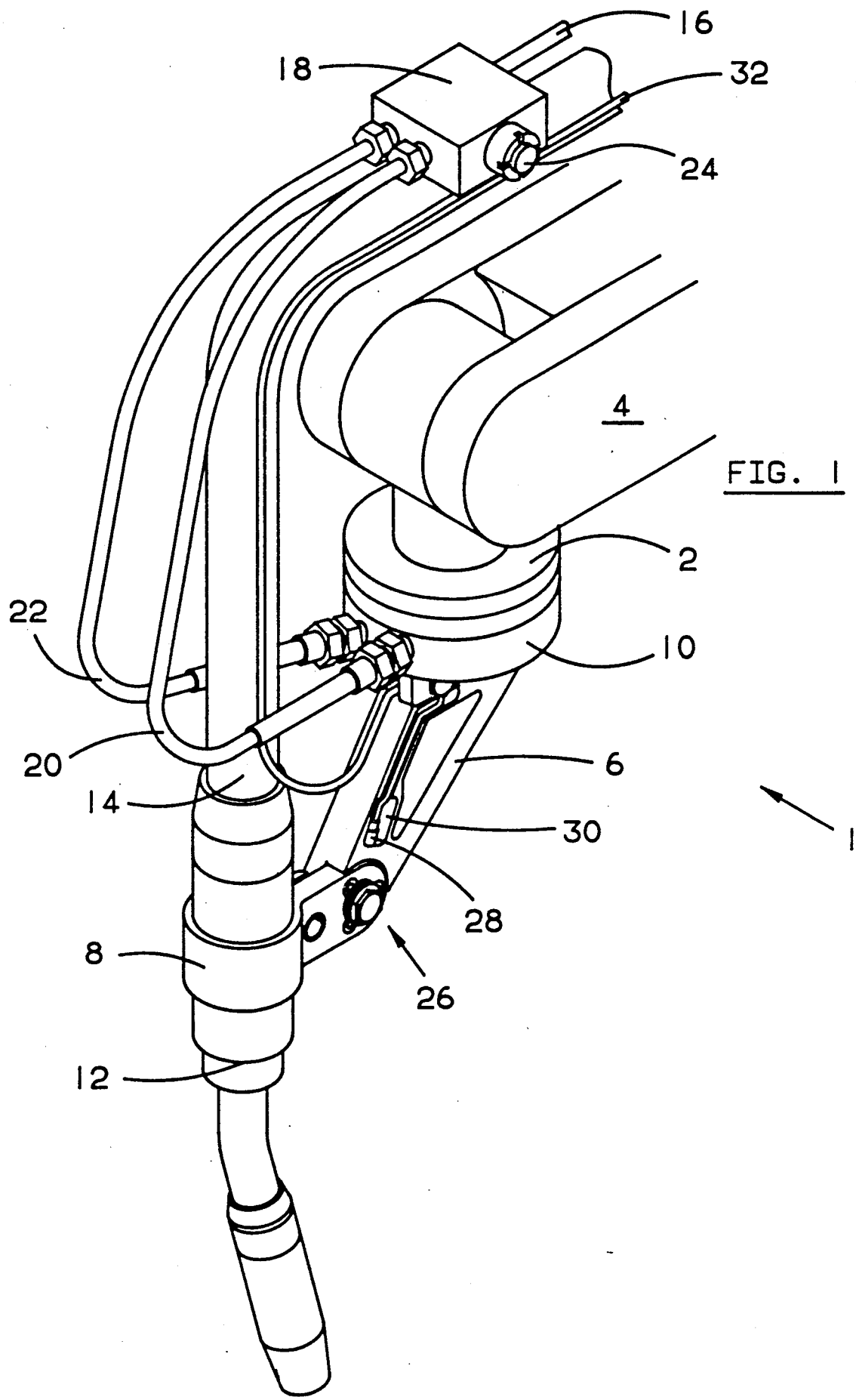
FIG. 1 is a perspective view of the preferred embodiment of the breakaway mount. One end of the pneumatically operated mount is removably attached to an automatic welding machine; the other end of the mount grips to a conventional MIG welding torch.

In FIG. 1, the breakaway mount is generally identified by the numeral 1. The mount 1 connects to a baseplate 2 which attaches to a robotic apparatus or other type of automated equipment 4.

The breakaway mount 1 includes three primary components, an elongate arm 6 having a torch clamp 8 on one end and a housing assembly 10 on the other end. In the preferred embodiment, the arm 6 and the clamp 8 are manufactured from aluminum or other lightweight metal or composite material. The torch clamp 8 engages a conventional MIG welding torch 12; however, the clamp could be used to engage any other type of tool. The torch 12 connects to a conventional power supply not shown in the drawing with a conventional cable 14. The MIG welding torch 12 is provided with power, shielding gas, and consumable wire through the cable 14 as is well-known to those skilled in the welding art.

In the preferred embodiment, the mount 1 is pneumatically operated and therefore, must be connected to a source of pressurized gas such as air or nitrogen, not shown in the drawing. The source of pressurized gas connects to an inlet pipe 16. The inlet pipe connects to a conventional three-way valve 18 with vent. A first conduit 20 connects the three-way valve 18 with a housing assembly 10. A second conduit 22 also connects the three-way valve 18 with a housing assembly 10. The three-way valve is actuated by a control means, such as a control button, 24 to switch the source of pressurized gas back and forth between the conduit 20 and conduit 22. Pressurized gas is at all times delivered to the housing assembly 10 for operational purposes.

The mount 1 can also include a wrist joint generally identified by the numeral 26 which allows the torch 12 to swivel back and forth as shown by the arrows in FIG. 2 in the event of an accidental collision with the workpiece. The mount 1 can also include a means for sensing movement of the wrist joint 26. In one embodiment, the means for sensing movement is a switch 28 which is mounted in a recess 30 in the arm 6. If the torch 12 collides with the workpiece in an unintentional fashion, causing the wrist joint 26 to swivel in response to excessive loading, the switch 28 senses the movement of the wrist joint and communicates this event via conductors 32 back to the robot or automatic machinery 4. When the machinery senses movement in the wrist joint, it is designed to automatically shut down to minimize or avoid damage to the torch, robot and/or the workpiece.

The mount 1 can also include a means for sensing partial and complete detachment of the housing assembly 10 from the baseplate 2. This can include another switch 17 better than seen in FIG. 3 which also communicates with the robot or the automated machinery 4 via the conductors 32. The machinery is likewise designed to shut down in the event of partial or complete disengagement of the housing assembly 10 from the baseplate 2 to minimize or avoid damage. Not all collisions will result in complete disengagement of the mount 1 from the baseplate 2. Some minor collisions will be sensed by the switch 17 which will shut down the machinery before full disengagement occurs. In other situations, the switch 17 will not react fast enough and the mount 1 will fully disengage from the baseplate 2 to prevent damage.

In FIG. 2, the mount 1 previously shown in FIG. 1 is shown in perspective view from another angle. A means to protect the wrist joint from welding splatter and/or other foreign contamination has been added to the apparatus shown in FIG. 2. A bellows 34 completely encircles the wrist joint 26 and provides this protective function. The bellows is formed from a flexible elastomeric material to allow the wrist joint 26 to freely swivel back and forth as shown by the arrows in the drawing, in the event of an accident. The first end 36 of the bellows 34 is sized to engage and seal around the welding clamp 8 to protect the wrist joint 26 from foreign contamination. The second end 38 of the bellows is likewise sized to engage and seal around the arm 6 to protect the wrist joint 26 from foreign contamination. The wrist joint 26 is arranged to swivel to and fro in response to excessive loading of the torch 12 as shown by the arrows in FIG. 2 and 3.

The housing assembly 10 has a channel 11 formed in the bottom thereof. A first binder post 13 and a second binder post 15 penetrate the channel 11 and the arm 6 to rigidly connect the arm 6 to the housing assembly 10. The channel 11 and binder post 13 are better seen in section view in FIGS. 4-7.

In FIG. 3, the mount 1 is shown in exploded view with the housing assembly 10 completely detached from the baseplate 2. The housing assembly is shown in partial section view as will be more particularly described in the following figures. Switch 17 is mounted in the housing assembly 10. The switch 17 connects to the conductors 32. The switch 17 is a means for sensing partial or complete detachment of the mount 1 from the baseplate 2. If the switch 17 senses the partial or complete detachment, it communicates this problem via the conductor 32 to a conventional control mechanism, not shown in the drawing, to shut down the automated machinery 4.

The wrist joint 26 has been partially disassembled and is shown in exploded view in FIG. 3 so that the torch clamp 8 is no longer connected with the arm 6 with the arm 6. A first disk 19 is shown. A second disk 105, not shown in this figure, is mounted in the torch clamp 8. The first disk 19 and the second disk 105, are designed to contact each other as better seen in FIG. 15. The first disk 19 is rigidly mounted to the arm 6 by a plurality of screws 21 or other suitable fastening means. The second disk 105 is rigidly mounted to the torch clamp 8 by a plurality of screws 23 or other suitable fastening means. The first disk 19 is urged into contact with the second disk 105 by the forces being exerted by the first spring means 126 and the second spring means 132. The second disk 105 and the torch clamp 8 are free, except for the aforementioned spring forces, to slip and rotate about the binder post 120 as shown by the arrows in FIG. 3 in response to an unexpected collision with the workpiece. Disassembly of the wrist joint 26 is accomplished by unscrewing the locking screw 124 from the binder post 120. After unscrewing and removing the locking screw 124 from the binder post 120, the binder post 120 can be removed from the bore 118 of the disk 19 and the bore 122 of the disk 105. The wrist joint 26 can then be disassembled allowing the torch clamp 8 to be removed from the arm 6.

Figure 4:
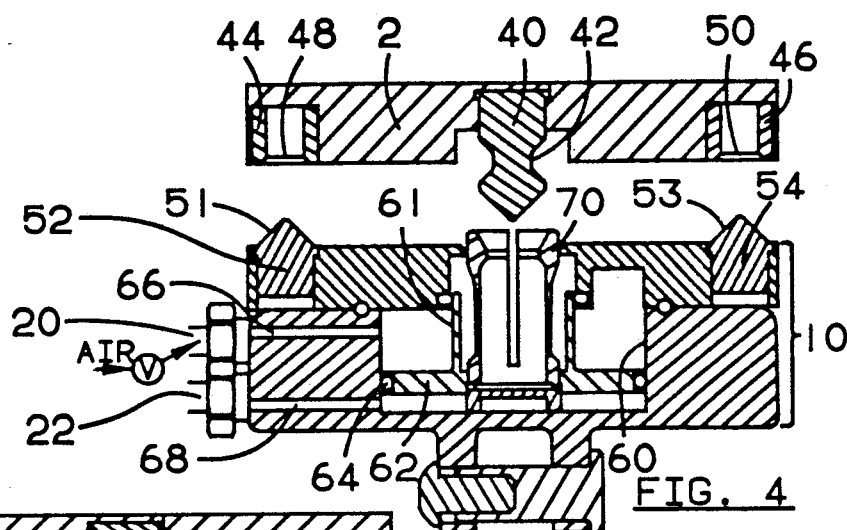
FIG. 4 is a section view of the baseplate and housing assembly with the mount fully detached from the baseplate. The sleeve and piston are shown in the fully retracted position.

FIG. 4 is a section view of the baseplate 2 being completely detached from the housing assembly 10. The baseplate 2 has at least one mounting pin 40 rigidly attached to the baseplate 2. The pin has at least one notch or groove 42 formed in the pin. A plurality of aligning bushings 44 and 46 are rigidly mounted in the baseplate 2. An interior circumferential bevel 48 and 50 is respectively formed at the leading edge of the alignment bushings 44 and 46 and is sized to engage respectively with the angular surface 51 on aligning pin 52 and the angular surface 53 on the aligning pin 54.

The housing assembly 10 is formed from a lower body 56 and a cap 58. The body 56 and the cap 58 are joined together by a plurality of bolts 59 shown in FIG. 17. The bolts 59 pass through a plurality of openings in the cap 58 and threadably engage a plurality of recesses 63 in the body 56. The recesses 63 are better seen in FIG. 16. The body 56 has an elongate cylinder 60 formed therein. A piston 62 is slidably mounted to move to an fro in the cylinder 60. An O-ring 64 is mounted on the exterior of the piston 62 to sealingly engage the piston 62 with the cylinder 60. The body 56 has a first port 66 therein which allows communication between the air conduit 20 and the cylinder 60. The body 56 has a second port 68 formed therein which allows communication between the second air conduit 22 and the cylinder 60.

Figure 12:
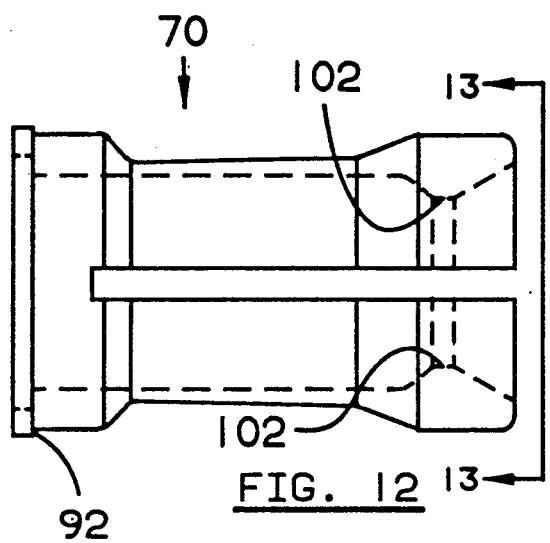
FIG. 12 is an enlarged perspective view of the sleeve shown in prior figures. The interior cavity of the sleeve is shown in phantom.
Figure 13:
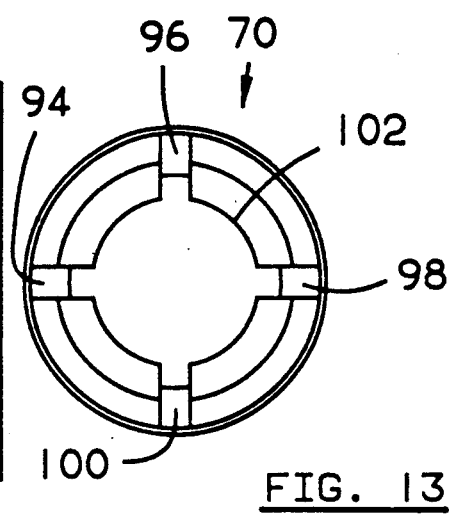
FIG. 13 is a view of the top of the sleeve along Line 13—13 of FIG. 12.

The piston 62 is rigidly attached to an elongate flexible sleeve 70, better seen in FIGS. 12 and 13. The elongate flexible sleeve 70 is sized and arranged to engage with the notch 42 on the mounting pin 40.

A guide 61 extends from the piston 62 and engages O-ring 63 forming a seal therewith. The guide abuts stop 67 as better seen in FIG. 5. The cylinder 60 is also sealed against the atmosphere by another O-ring 65 captured between the body 56 and the cap 58. The O-rings 63 and 65 seal the double-acting cylinder 60 from the atmosphere. The piston 62 is therefore free to move to and fro in the cylinder 60 in response to air pressure being applied through either port 66 or port 68. During operation, pressurized air is continuously supplied to the cylinder 60 by either the conduit 20 or the conduit 22. In FIG. 4, the three-way valve 18 directs air pressure through the air conduit 20 and the port 66 into the cylinder 60 driving the piston 62 and the sleeve 70 into the fully retracted position as shown.

Figure 5:
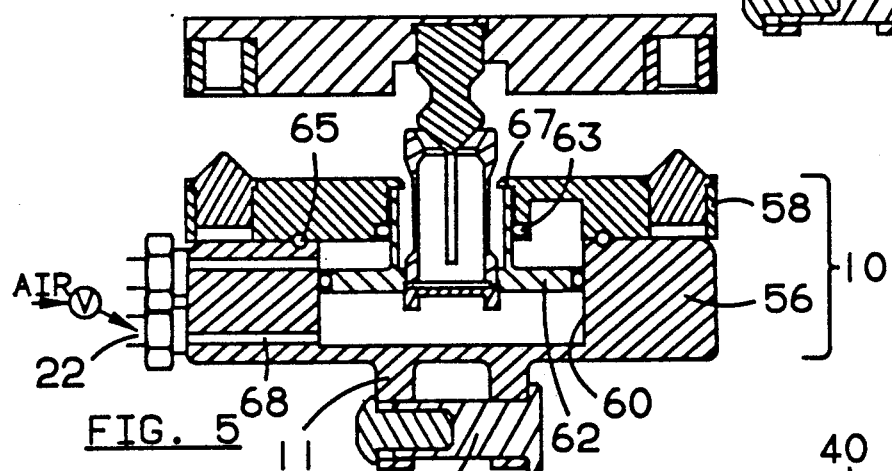
FIG. 5 is a section view of the baseplate and housing assembly showing the sleeve and piston in their fully extended position. This view shows the housing assembly in a position underneath the baseplate just prior to engaging the sleeve with the pin.

In FIG. 5, the three-way valve 18 has reversed the flow of pressurized gas from conduit 20 to conduit 22 which passes through port 68 into the cylinder 60. This reversal in the air pressure drives the piston 62 and the sleeve 70 into the fully extended position as shown in FIG. 5.

Figure 6:
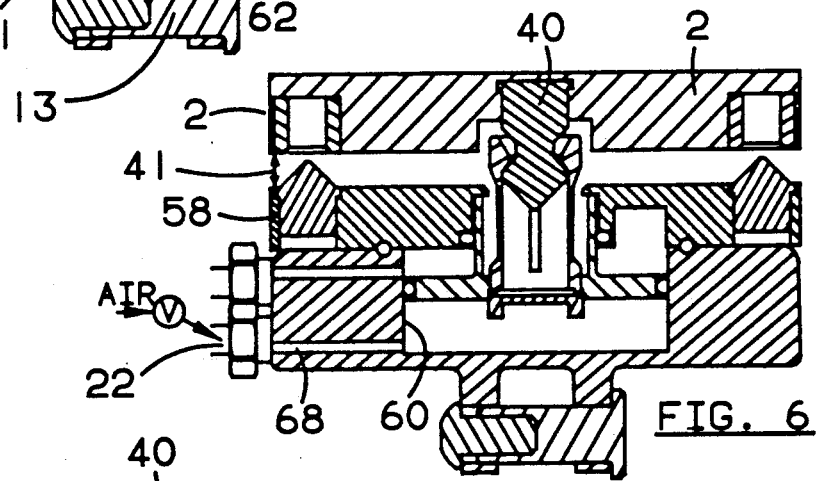
FIG. 6 is a section view of the baseplate and the housing assembly showing the sleeve and piston in their fully extended position. This figure shows the first step of attachment whereby the sleeve has been manually engaged with the pin.

In FIG. 6, air pressure is still being applied through the valve 18 and air conduit 22 through port 68 to the cylinder 60. The operator then takes the mount and manually engages the sleeve 70 with the mounting pin 40 as shown in this figure. Once engaged, the sleeve 70 has sufficient force to hold the mount 1 as shown without further manual assistance. A gap 41, shown by the arrows in the figure, exists between the cap 58 and baseplate 2. This gap protects the operator's hand from being pinched when the sleeve 40 is manually engaged with the pin 40.

Figure 7:
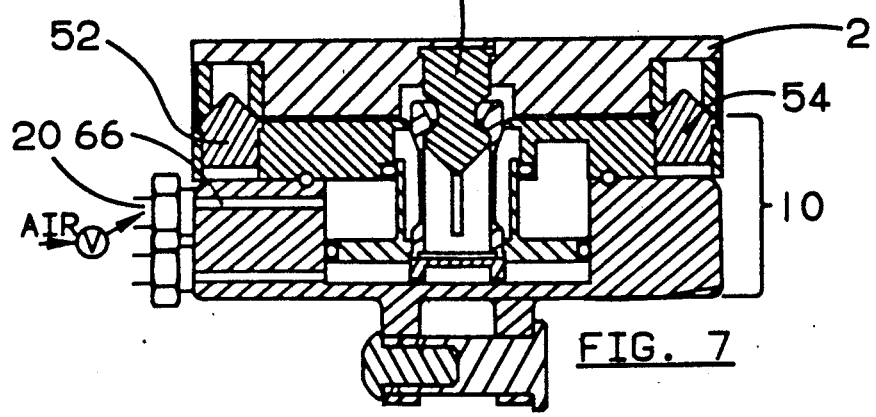
FIG. 7 is a section view of the baseplate and housing assembly with the sleeve and piston in the fully retracted position. This figure shows the second step of attachment whereby the mount has been fully attached to the baseplate.

In FIG. 7, the operator presses the button 24 which actuates the three-way valve 18 again reversing the flow of pressurized air from conduit 22 to conduit 20. Pressurized air is then applied through passage 66 to the cylinder 60 driving the piston 62 and the sleeve 70 into the fully retracted position thus firmly attaching the mount 1 with the baseplate 2. The three-way valve 18 is vented thus allowing any opposing pressure in the cylinder to escape once the valve is switched from one conduit to the other.

As the housing assembly 10 begins to engage the baseplate 2 in response to the forces exerted by the piston cylinder arrangement, the aligning pins 52 and 54 engage aligning bushings 44 and 46 thus returning the mount 1 and the torch 12 to proper alignment with the robot or other automated machinery 4. The pressurized air will be continuously applied through the valve 18, the conduit 20, the passage 66 to the cylinder 60 during operation of the apparatus to keep the piston 62 and the sleeve 70 in a rearward position to maintain attachment of the mount 1 with the baseplate 2. Air pressure is applied to the cylinder 60 to maintain the piston 62 in the rearward position shown in this figure. The operator can select the desired air pressure, which will typically range between 50-150 psi, by adjusting a regulator, not shown in the drawings to vary the threshold for detachment of the mount 1 from the baseplate 2. However, the event of a collision, the forces exerted on the mount 1 may exceed the forces acting against the piston 62, thus causing the housing assembly 10 to separate from the baseplate. As this separation occurs, the piston 62 will be pulled by the pin toward the extended position until the sleeve 70 fully disengages from the pin 40 as a result of the collision forces being exerted on the mount 1.

In FIG. 8, an alternative embodiment of the breakaway mount 1 is shown. The alternative embodiment uses a manual screw 80 which abuts, but is not attached to, the piston 62 to drive the piston from the retracted position as shown in FIG. 8 to the extended position as shown in FIGS. 9 and 10. A spring 82 is mounted in a recess 84 in the cap 58. Two other springs, 85 and 87, better seen in FIG. 16 also act against the piston 62. The bottom of the spring 82 engages the piston 62 and urges the piston and the sleeve 70 to their rearward position when the screw 80 is fully withdrawn from the body 56 as shown in this figure. The screw 80 is in an elongate cylindrical shaft having a plurality of threads 86 on one end and a nut-shaped head 88 on the other end. The threads 86 of the screw 80 engage the threads 90 formed in the body 56 of the housing assembly 10.

In FIG. 9, a wrench 92 has been placed over the head 88 of the screw 80. The wrench is rotated clockwise thereby advancing the screw 80 into the cylinder 60. As the screw 80 advances in the cylinder 60, the piston 62 and sleeve 70 are driven to their extended position as shown in this figure. The spring 84 is compressed by the forces exerted on the piston 62 through the screw 80. There are no O-rings in this embodiment sealing the piston 62 to the cylinder 60. The piston 62 therefore moves to and fro in the cylinder 60 and gas bypasses the cylinder so there is no vapor lock.

In FIG. 10, an operator has manually engaged the sleeve 70 with the mounting pin 40 as the first step in attaching the mount 1 to the baseplate 2.

In FIG. 11, the screw 80 has been rotated counterclockwise thereby retracting it from the cylinder 60 which allows the piston 62 and the sleeve 70 to move to the rearward position in response to urging by the spring 84. Because the screw 80 is manually operated by the wrench 92, there is little chance that the operator will pinch his hand when the housing 10 is firmly attached to the baseplate 2 as shown in FIG. 11.

FIG. 12 is an enlargement of the sleeve 70. The interior of the sleeve is shown in phantom. The sleeve 70 has an enlarged shoulder 92 for engagement with the piston 62. A plurality of radial slots 94, 96, 98 and 100 permit the sleeve 70 to flex as it engages the mounting pin 40. A radial claw 102 is formed on the interior of the sleeve 70 as shown in phantom view in FIG. 12. The claw 102 can be of any general shape provided that it engages an mates with the notch or groove 42 in the pin 40.

FIG. 13 is a top view of the sleeve 70 along Line 13—13 of FIG. 12. The radial slots 94, 96, 98, and 100 are readily apparent in FIG. 13. The slots which extend substantially the entire length of the sleeve divide the sleeve into four separate fingers each of which has an interior radial claw 102 therein.

Figure 14:
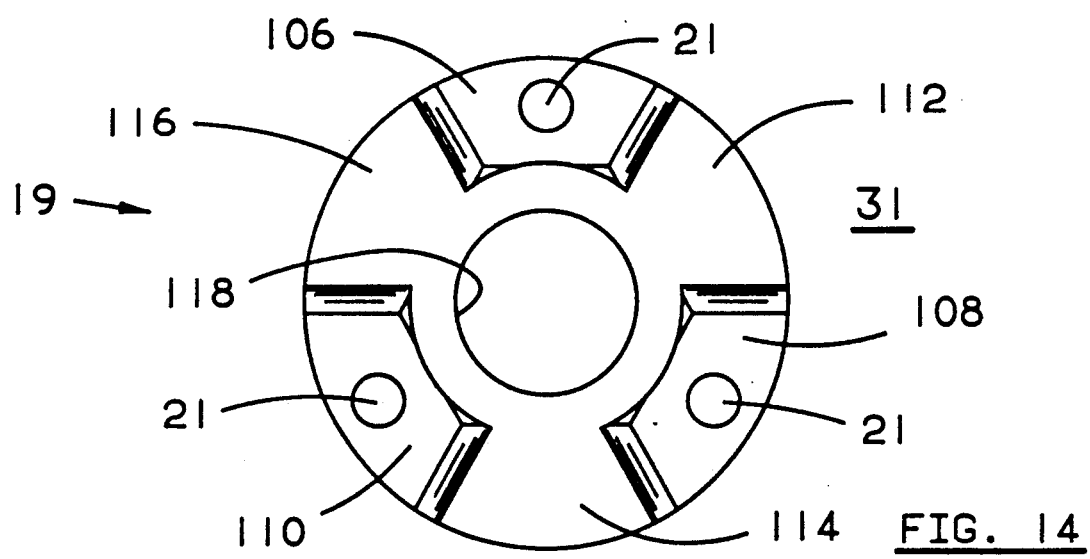
FIG. 14 is a plan view of one of the disks which makes up the wrist joint. The disk of FIG. 14 is similar to the disk shown in FIG. 3.

FIG. 14 is a view of the front face 31 of disk 19 which is also shown in FIG. 3. The disk 19 rigidly attaches to the arm 6 by a plurality of screws 21. The disk 19 has a plurality of protrusions 106, 108 and 110 extending from the front face thereof. In between the protrusions are a plurality of channels 112, 114, and 116. In the center of the disk 19 is a central bore 118.

Figure 15:
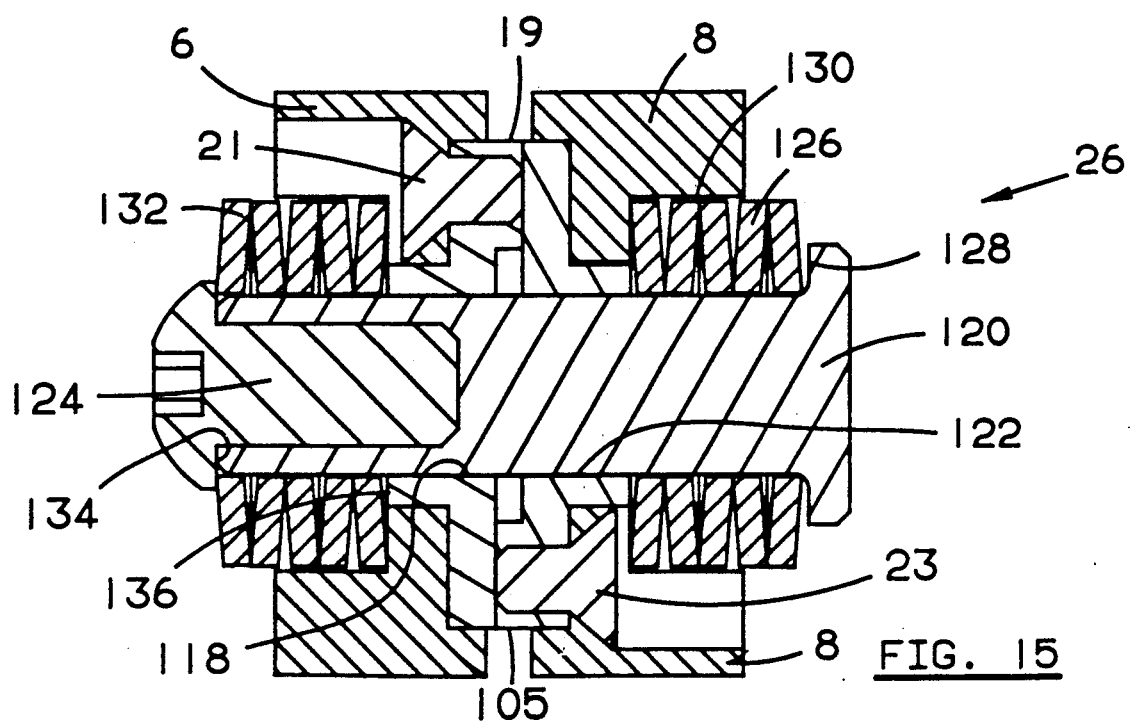
FIG. 15 is a section view of the wrist joint.

FIG. 15 is a section view of the wrist joint 26. A first disk 19 is urged into contact with the second disk 105 when the binder post 120, the locking screw 124, the first spring means 126 and the second spring means 132 are assembled. The second disk 105 is built identically to the first disk 19. The protrusion 106, 108 and 110 extend from the face of disk 19 and engage corresponding channels in the face of the other disk 105. Three identical protrusions extend from the face of the disk 105 and engage corresponding channels 112, 114 and 116 in the face of the other disk 19. The protrusions and channels of both disks 19 and 105 are sized to receive and engage each other when the disks 105 and 19 are urged into contact with each other by the spring forces exerted by the first spring means 126 and the second spring means 132 which are captured and compressed when the locking screw 124 is threaded into the binder post 120. The first disk 19 is rigidly attached to the arm 6 by a plurality of screws 21 or other suitable mounting means. The second disk 105 is rigidly attached to the clamp 8 by a plurality of screws 23.

A binder post 120 passes through the central bore 118 of the first disk 19. The second disk 105 has a matching central bore 122 through which the binder post also passes. A locking screw 124 threadably engages the binder post 120. A first spring means 126 mounts between a first shoulder 128 on the binder post 120 and the second face 130 of the second disk 105. A second spring means 132 shown on the drawings as belleville washers, is captured on the binder post between a first shoulder 134 on the locking screw 124 and the second face 136 of the first disk 19. The disk 19 does not move or rotate because it is rigidly attached to the arm 6; however, the disk 105 and the attached torch clamp 8 are free to rotate, except for the aforementioned spring forces, about the binder post 120 in response to excess loading forces on the torch due to an unexpected collision.

The first spring means 126 and the second spring means 132 force the first disk 19 into contact with the second disk 105 as shown in the figure. The torch clamp 8 is rigidly attached to the second disk 105. When the torch 12 has a collision, loading forces are exerted through the torch clamp 8 onto the second disk 105. When these forces exceed compression forces being exerted by a first spring means 126 and second spring means 132, the second disk 105 will rotate out of engagement with the first disk 19. This ability to rotate in the wrist joint is a further means of protecting the robot or other automated machinery, the workpiece and the tool from high impact, accidental collisions.

FIG. 16 is a view of the body 56 taken along line 16—16 of FIG. 8. The spring 82 shown in FIGS. 8-10 is shown together with the other springs 83 and 85. These springs 82, 83 and 85 are shown resting on the piston 62. The guide 61 surrounds the sleeve 70. A receptacle 57 is formed in the body 56 to receive the switch 17, better seen in FIGS. 17 and 3. A plurality of threaded holes 63 are formed in the body 56 to receive the plurality of bolts 59 to hold the body 56 to the cap 58.

FIG. 17 is a view of the cap 58 taken along line 17—17 of FIG. 8. The switch 17 is shown in the receptacle 57. The switch 17 has a spring-loaded protrusion 77 which extends above the cap 58 and engages the baseplate 2. When the mount is firmly attached to the baseplate 2, the protrusion 77 is depressed and senses proper attachment of the mount 1 to be the baseplate 2. If there is a collision resulting in partial or complete disengagement of the mount 1 from the baseplate 2, the protrusion extends beyond the cap 58 and senses a problem which is communicated to a controller which shuts down the automated machinery 4. Aligning pins 52 and 54 are shown. Other aligning pins 53 and 75 can also be added to the cap 58 to facilitate proper alignment of the mount 1 with the baseplate 2. A plurality of bolts 59 connect the cap 58 to the body 56 of the housing 10.

OPERATION OF THE PREFERRED EMBODIMENT

The pneumatic breakaway as shown in FIGS. 1-7 is a unique coupling apparatus for attaching a tool such as the welding torch 12 with the robot or other automated machine 4. This unique breakaway mount protects not only the machinery in the event of a collision, but it protects the operator who must manually re-attach the mount 1 with the baseplate 2 in the event of a serious collision which causes the breakaway mount to be completely detached from the baseplate.

In normal operation, pressurized air will be applied through a valve 18 to the air conduit 20 and the port 66 to the cylinder 60. This continual air pressure will cause the piston 62 and the sleeve 70 to remain in its fully retracted position as shown in FIG. 7. The operator can select the desired air pressure, which will typically range between 50-150 psi, to vary the threshold for detachment of the mount 1 from the baseplate 2. In some delicate applications a low breakaway threshold may be desired, in other applications, higher breakaway thresholds may be necessary. If the apparatus encounters a significant collision the forces exerted on the mount 1 will be sufficient to overcome the air pressure in the cylinder 60 thus causing the piston 62 to rise slightly enabling the sleeve 70 to disengage from the pin 40 if collision forces continue to exert excessive loading. The breakaway mount will then fall away from the baseplate 2 suspended by the primary welding torch cable 14. The mount 1 can be equipped with a switch 17 or other sensing means to detect partial or complete detachment of the mount from the baseplate. If a sensing means is used, it will generally detect even the slightest degree of disengagement of the mount 1 from baseplate 2 and will stop the robot or automated machinery prior to complete disengagement; however, from time to time, momentum or other factors will cause the mount to fully break away.

In order to replace the mount on the baseplate, the operator must first actuate three-way valve 18 by depressing the button 24. This will switch the pressurized source of air from the conduit 20 to the conduit 22 which passes through the port 68 into the cylinder 60. This source or pressurized air then drives the piston 62 and the sleeve 70 into a fully extended position as shown in FIG. 5. The guide 61 encounters stop 67 thus limiting the travel of piston 62. The operator then manually engages the sleeve 70 with the mounting pin 40 as shown in FIG. 6. The sleeve has sufficient gripping forces to fully support the mount without assistance from the operator. The operator then removes his hands from the mount and baseplate and actuates the three-way valve by pushing button 24. Pressurized air is then switched from the conduit 22 to the conduit 20 which passes through port 66 into cylinder 60. The pneumatic forces then drive the piston 62 and the sleeve 70 to the fully rearward position as shown in FIG. 7. The mount 1 is then in full engagement with the baseplate 2. The three-way valve is vented, thus preventing vapor lock in the cylinder 60 when the air pressure is switched back and forth from conduit 20 to 22.

The mount 1 can also include a wrist joint 26 between the torch clamp 8 and the arm 6. A first disk 19 is rigidly connected to the arm 6. A second disk 105 is rigidly connected to the torch clamp 8. A plurality of protrusions and channels extend from the first face 31 of the first disk 19. A complementary series of protrusions and channels extends from the first face of the second disk 105. The first face of the first disk and the first face of the second disk engage and mate with one another in response to forces exerted by first spring means 126 and second spring means 132. In the event of a collision which overcomes the spring forces, disk 19 and disk 105 are free to swivel in opposite directions, thus allowing the torch 12 and clamp 8 to move independently of the arm 6 to prevent damage to the torch, the robot or the workpiece. A switch 30 or other sensing means senses many movement of disk 105 relative to the arm 6 and communicates with a controller to shut down the automated machinery 4.

In the alternative embodiment, the mount 1 is manually operated by a screw 80 and a wrench 92 or other suitable means which can impart rotational forces to the screw. The piston 62 is normally urged into the retracted position by springs 83, 84, and 85. In the event that the mount 1 completely breaks away from baseplate 2, the operator must manually rotate the screw 80 to move the piston 62 and the sleeve 70 to the fully extended position as shown in FIG. 9. The operator then manually forces the sleeve 70 into engagement with the mounting pin 40 as shown in FIG. 10. The operator then rotates the screw 80 counterclockwise retracting it from the cylinder 60 thereby allowing the piston 62 to return to the retracted position in response to forces exerted thereon by springs 83, 84, and 85.

While the foregoing is directed to the preferred embodiment of the present invention, other and further embodiments of the invention may be devised without departing from the basic scope thereof, and the scope thereof is determined by the claims which follow.

What is claimed is:

1. A breakaway mount for attaching a tool to a robot, the tool being used to perform manufacturing operations on a workpiece comprising:
   a. A base plate connected to said robot and having a mounting pin protruding from said plate, said pin having at least one notch therein;
   b. An elongate arm including a tool clamp on one end and a housing assembly on the other end;
   c. Means for releasably engaging said mounting pin to attach said housing assembly to said base plate during normal operation of said robot, and means for activating said engaging means to automatically release said mounting pin when said tool clamp experiences an unexpected collision with said workpiece to allow said housing assembly to disengage from said base plate to minimize possible damage to said tool, said robot and said workpiece, said means for releasably engaging said mounting pin comprising:
      (i) an elongate cylinder formed in said housing assembly having a first and second end;
      (ii) a piston slidably mounted in said cylinder and in sealing engagement with said cylinder, said piston having an extended and a retracted position;
      (iii) an elongated flexible sleeve sized to receive said pin and engage said notch in said pin, said sleeve being mounted on said piston and travelling with said piston as it moves from said extended to said retracted position in said cylinder; and
   (d) Means for properly aligning said housing assembly relative to said base plate.

2. The apparatus of claim 1 further including means for sensing partial and complete detachment of said housing assembly from said base plate.

3. The apparatus of claim 2 wherein said means for sensing partial and complete disengagement of said housing assembly includes a switch mounted in said housing assembly and having a probe which contacts said base plate, said probe being depressed when said housing assembly and said base plate are properly attached, said probe sensing partial and complete disengagement of said base plate from said housing assembly.

4. The apparatus of claim 2 further including:
   a. a wrist joint positioned in said elongate arm between said clamp and said housing assembly; and
   b. means for sensing movement in said wrist joint.

5. The apparatus of claim 4 wherein said wrist joint further includes:
   a. a first disk having a front and rear face, said front face having a plurality of channels and protrusions therein, said first disk having a central bore therein;
   b. a second disk having a front face and a rear face, said front face having a plurality of channels and protrusions therein sized to mate and engage with said channels and protrusions in said first disk, said second disk having a central bore therein;
   c. a binder post passing through said central bore of said first and second disk to align said first and second disk;
   d. a first spring means mounted on said binder post and engaging said rear face of said first disk;
   e. a second spring means mounted on said binder post engaging said rear face of said second disk, said first spring means and said second spring means urging said front face of said first disk and said front face of said second disk into engagement during normal operation of said mount, said first and second spring means having sufficient elasticity to allow disengagement of said first and second disk to allow said wrist joint to rotate in response to excessive loading; and
   f. a removeable locking screw threadably engaging said binder post to trap said first spring means and said second spring means on said binder post.

6. The apparatus of claim 5 wherein said means for sensing movement in said wrist joint includes:
   a. a switch positioned on said arm having a probe which contacts said first disk attached to said clamp, said probe sensing any movement of said first disk relative to said second disk.

7. The apparatus of claim 4 further including means to protect said wrist joint from foreign contamination.

8. The apparatus of claim 7 wherein said protection means incudes:
   a. an elongate hollow elastomeric bellows having a first end and a second end;
   b. said first end of said bellows sized to engage and seal with said clamp to protect said wrist joint from foreign matter;
   c. said second end of said bellows sized to engage and seal said arm to protect said wrist joint from foreign matter; and
   d. said bellows being formed of flexible material to allow said wrist joint to freely rotate.

9. The apparatus of claim 1 wherein said means for releasably engaging said pin to attach said housing assembly to said baseplate further includes:
   a. a pressurized source of air;
   b. a port in said housing in communication with said first end of said cylinder for the passage of said air;
   c. a second port in said housing in communication with said second end of said cylinder for the passage of said air; and
   d. valve means to switch said pressurized source of air from said first port to said second port to drive said piston and said sleeve to its extended position for engagement of said sleeve and said pin and to switch said pressurized source of air from said second port to said first port to drive said piston and said sleeve to its retracted position to attach said housing assembly to said base.

10. The apparatus of claim 1 wherein said means for releasably engaging said pin to attach said housing assembly to said base plate further includes:
    a. a threaded shaft engaging said housing, one end of said shaft connected to said cylinder and the other end of said shaft protruding from said housing;
    b. a removable handle for engaging said second end of said shaft, rotation of said handle causing said shaft to rotate and causing said piston to move back and forth from the extended to the retracted position.

11. The apparatus of claim 1 wherein said means for properly aligning said housing assembly relative to said base plate includes:

a. a plurality of aligning pins protruding from said housing assembly;
b. a plurality of alignment bushings in said base plate, said bushings sized and configured to receive said aligning pins to align said housing relative to said base plate.

* * * * *